United States Patent [19]

Vaccaro et al.

[11] Patent Number: 4,958,975

[45] Date of Patent: Sep. 25, 1990

[54] CART WHEEL CONTROL FOR HOISTWAY CAR

[75] Inventors: Angelo M. Vaccaro, Charlotte, N.C.; Robin C. Morse, Elizabethtown, N.Y.

[73] Assignee: The Peelle Company, Bay Shore, N.Y.

[21] Appl. No.: 246,788

[22] Filed: Sep. 20, 1988

Related U.S. Application Data

[60] Division of Ser. No. 909,036, Sep. 18, 1986, Pat. No. 4,787,802, which is a continuation-in-part of Ser. No. 803,103, Nov. 27, 1985, abandoned.

[51] Int. Cl.[5] .................................. B65G 1/04

[52] U.S. Cl. .................................. 414/259; 104/172.3

[58] Field of Search ............. 104/35, 42, 172.1, 172.2, 104/172.3, 204; 414/280, 661, 241, 259, 277, 279, 400, 401, 402, 494, 679, 609, 253; 198/468.11, 478, 718

[56] References Cited

U.S. PATENT DOCUMENTS

| | | | |
|---|---|---|---|
| 3,040,913 | 6/1962 | Foster, Jr. et al. | 104/172.3 X |
| 3,114,332 | 12/1963 | Bacon et al. | 104/172.3 X |
| 3,831,794 | 8/1974 | Bohman | 104/172.3 X |
| 4,148,404 | 4/1979 | Heisler | 414/259 |
| 4,759,676 | 7/1988 | Hammond | 414/286 X |

FOREIGN PATENT DOCUMENTS

| | | | |
|---|---|---|---|
| 262295 | 2/1960 | Australia | 104/35 |
| 117448 | 2/1899 | Fed. Rep. of Germany | 104/42 |
| 640152 | 7/1928 | France | 104/172.3 |

*Primary Examiner*—Frank E. Werner
*Attorney, Agent, or Firm*—Pearne, Gordon, McCoy & Granger

[57] ABSTRACT

A hoistway car for transporting wheeled carts between floor levels which includes mechanism for reversing the cart swivel wheels to facilitate off-loading of the cart while avoiding chafing or jamming of such swivel wheels. In the illustrated embodiments, the reversing mechanism comprises turntables at the plane of the car platform which turn in predetermined directions to control wheel swivel action. In one embodiment, the turntables rely on gravitational forces to initiate swivel action, and in another embodiment, the turntables are power-operated for inducing swivel action.

6 Claims, 4 Drawing Sheets

CART WHEEL CONTROL FOR HOISTWAY CAR

This is a division of application Ser. No. 909,036, filed Sept. 18, 1986 now U.S. Pat. No. 4,787,802, which is a continuation-in-part of application Ser. No. 803,103, filed Nov. 27, 1985, now abandoned.

BACKGROUND OF THE INVENTION

The invention relates to improvements in material handling apparatus and, in particular, to lift systems for moving wheeled carts between floor levels.

PRIOR ART

Wheeled carts are commonly used for efficient transport of materials across and between separate floors in hospitals, factories, warehouses, office buildings, and like facilities. Such carts are used in combination with elevating equipment in the form of a material lift or dumbwaiter. A cart is typically manually propelled on the floor and has a swivel wheel set on one end to permit it to be freely routed on the floor. U.S. Pat. No. 4,148,404 discloses a successful cart transfer device which is disposed on the platform of a lift car. The transfer device automatically loads a cart from a waiting position on a floor onto the car and, after the car has changed floor level, unloads the cart. The transfer device includes apparatus which temporarily couples with pin elements on the cart to permit pulling and pushing, as well as guiding op the cart on and off the platform.

The lift car platform size is typically limited by the hoistway area which, in turn, can be restricted for various reasons in both new construction and existing structures. To avoid contact between the cart and the sides of the lift car, and otherwise guide the cart, it is customary to provide wheel guide tracks on the car platform and on the floor level entrances to the lift.

A problem encountered with these wheel guide track arrangements-is that the swivel wheels tend to scrub and bind against the sides of the tracks when the cart is off loaded in a reverse direction, causing premature wheel wear and the potential for the cart to jam against such movement.

Another disadvantage of the wheel/track system is the labor cost associated with its fabrication and installation. These costs may be relatively high, for example, where the floor level tracks are set in a terrazo surface, or are otherwise embedded in the floor.

SUMMARY OF THE INVENTION

The invention provides apparatus on a lift platform for reversing the swivel wheels of a cart between loading and unloading movement. The apparatus avoids wheel swivel induced lateral shifting of the cart against the lift car or hoistway door opening, while accommodating an automatic transfer device disposed on the lift platform. The transfer device couples onto a cart and determines the loading and unloading path of the cart on and off the platform. The wheel reversing apparatus of the invention avoids the necessity of tracks on the floor levels at the lift entrances and on the lift platform for laterally restraining and guiding the cart wheels during loading and unloading.

The wheel reversing apparatus thus eliminates the direct cost of wheel tracks and that associated with their installation. Further, the wheel reversing apparatus of the invention eliminates wheel jamming and premature wheel wear. In one illustrated embodiment, the wheel reversing apparatus comprises a pair of turntables each generally disposed at the plane of the lift platform and in the path of a respective one of the swivel wheels.

When the swivel wheels encounter their associated turntables, they are automatically caused to swivel and reverse direction between final loading movement and initial unloading movement of the cart. Ideally, each turntable rotates about an axis which is tilted or chamfered laterally slightly from the vertical. The inclination of the turntable surface allows gravity to initiate wheel reversing movement. The turntables are disposed on the lift platform at points which allow registry with the swivel wheels when the cart is fully loaded onto the lift platform. The swivel action of the wheels is accommodated by corresponding rotational movement of the turntables.

In a second disclosed embodiment of the invention, the swivel wheel reversing apparatus includes a pair of power operated turntables which are positively rotated to induce reversal of the swivel wheels at an appropriate time in the cart loading and unloading cycle.

DETAILED DESCRIPTION OF THE INVENTION

Figure 1:
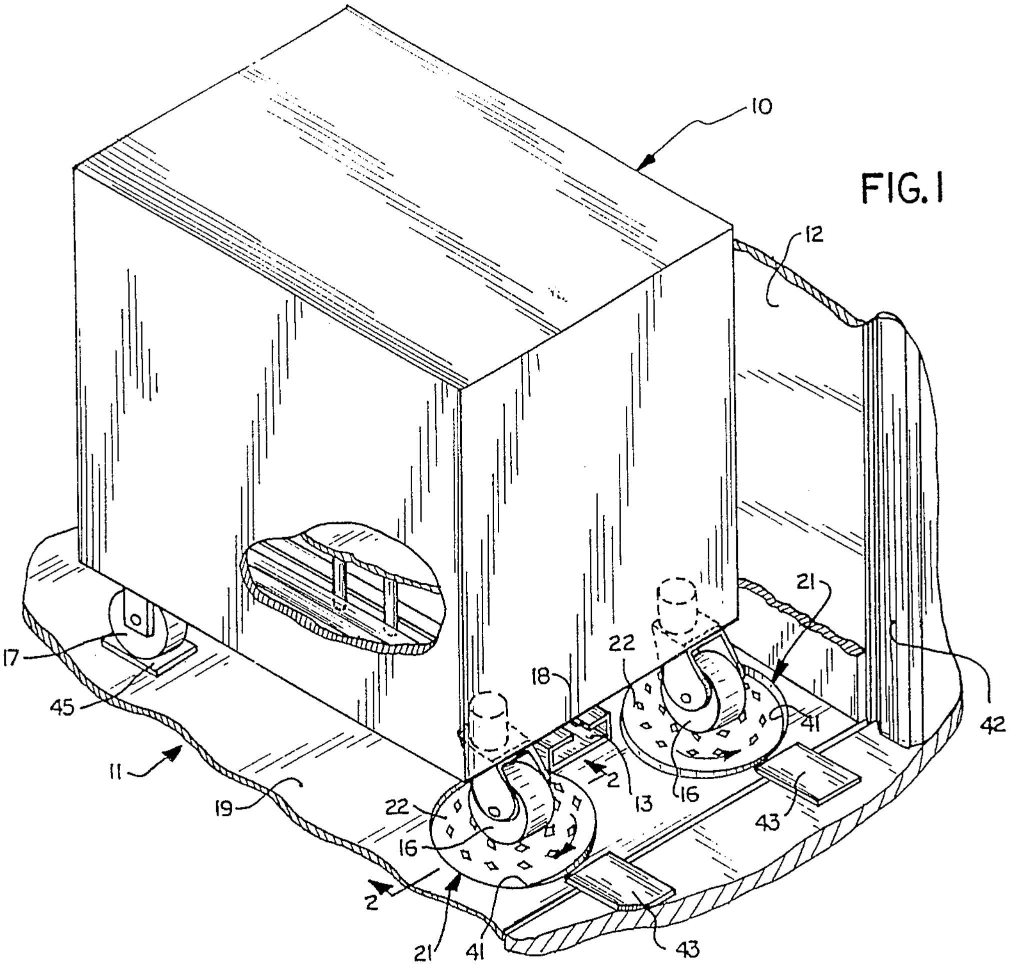
FIG. 1 is a perspective view of a cart loaded on a hoistway car embodying the invention.

Referring now to the drawings, and in particular to FIG. 1, there is shown a wheeled cart 10 which is carried between floors in a building on a car 11 of a vertical hoistway generally indicated at 12. The cart 10 is automatically moved on and off the cart by a transfer device 13 such as that shown in U.S. Pat. No. 4,148,404, the disclosure of which is incorporated herein by reference. The cart 10 is generally rectangular in plan view and is supported by four wheels 16, 17, one adjacent each of its corners. The wheels 16 at the trailing end of the cart 10 are swiveled to permit the cart to be easily steered when it is moved manually across the floor of the building. The transfer device 13 includes an elongated, slotted housing 18 in the center of the car 11 which lies above the platform or floor 19 of the car. When the cart 10 is loaded on the car 11, the transfer device 13 lies below the bottom pan of the cart and is straddled by the cart wheels 16, 17. On each side of the car platform 19 in the path of the respective righthand and lefthand wheels 16, 17 is wheel reversing apparatus 21. This apparatus 21 includes a turntable 22 having its upper surface 23 generally at the same elevation as that of the car platform 19.

Figure 2:
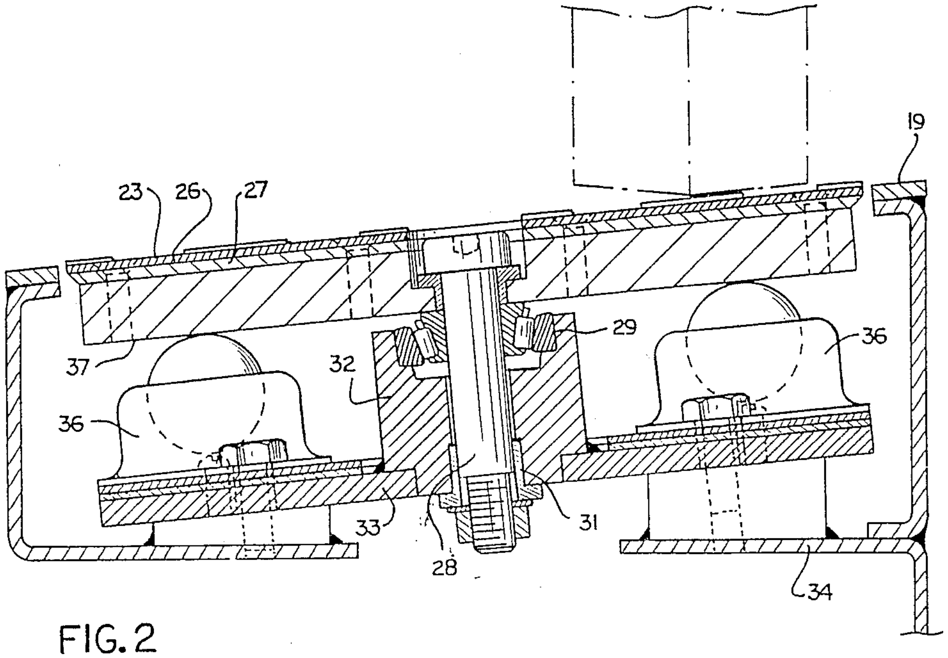
FIG. 2 is a fragmentary, cross-sectional view of a wheel reversing apparatus taken along the lines 2—2 of FIG. 1.
Figure 3:
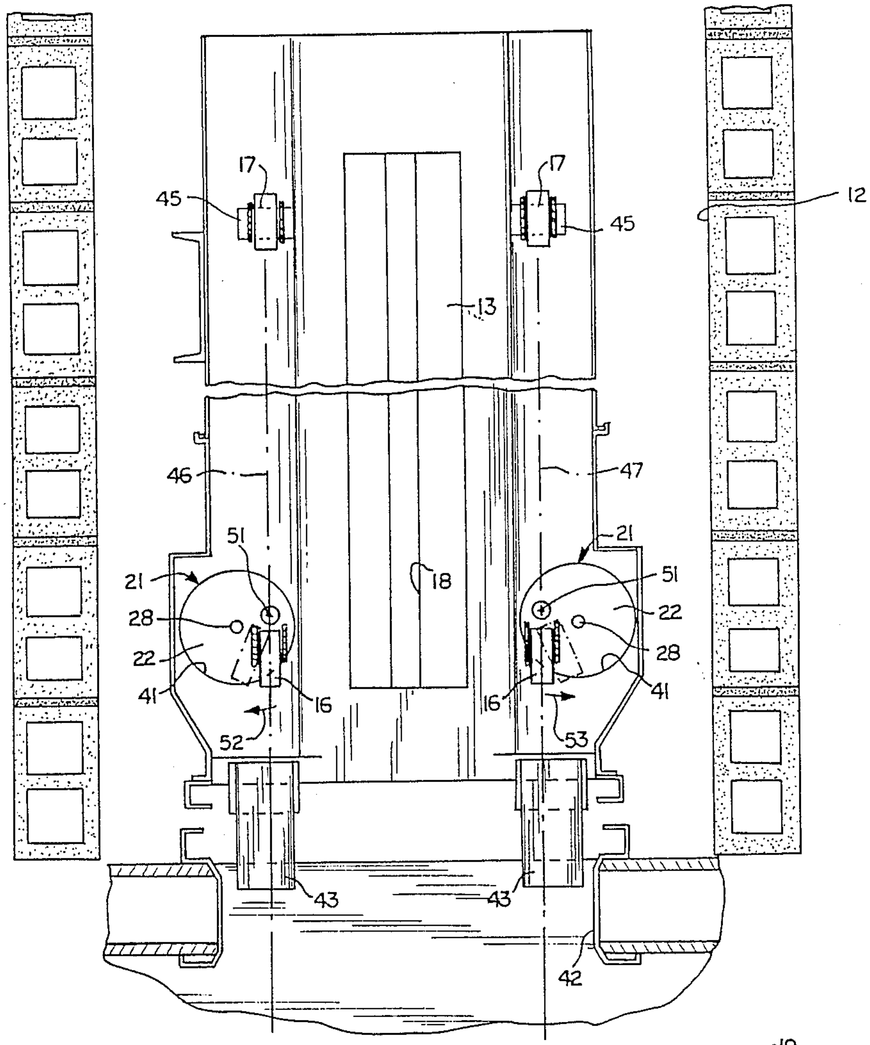
FIG. 3 is a somewhat schematic, fragmentary plan view of the hoistway car platform and an associated landing area.

As indicated in FIG. 2, the turntable 22, which includes a pair of sandwiched circular plates 26, 27, is rotatably supported on the car 11 by an axle 28 that turns in an antifriction bearing 29 and a coaxial bushing 31. The bearing 29 and bushing 31 are carried in a hub 32 which is fixed to a mounting plate 33 that is bolted to a bracket 34 fixed to the framework of the car platform 19. The turntable plates 26. 27 are additionally supported on a plurality of antifriction ball casters 36 angularly spaced about the hub 32 and engaging a bottom surface 37 of the lower plate 27. The ball casters 36 are fixed on the mounting plate 33. The upper turntable plate 26, which is secured to the lower plate 27 by screws, has its upward face 23 provided with a checker plate pattern for reliable friction engagement with the swivel wheels 16 op the cart 10. The bearings 29, bushing 31, and casters 36 are arranged to support the axle 28 and turntable plates 26, 27 for rotation about an axis which is tilted or cambered outwardly off the vertical from the center of the car 11. In the illustrated embodiment, the angle of tilt is 7 degrees. FIG. 3 generally illustrates the layout of the car floor or platform 19. The turntables 22 are centered in circular holes 41 in the car platform or floor 19.

The transfer device 13 is arranged to pick up a car on a building floor and transfer it through a hoistway door, represented by a jam 42, onto the car platform 19 in a manner more fully described in aforementioned U.S. Pat. No. 4,148,404. Drawbridges 43 are provided to bridge the gap between the building floor and the car platform 19 for passage of the cart wheels 16, 17. When a cart 10 is fully transferred onto the platform 19, the leading non-swiveling wheels 17 are parked over plates 45 and the trailing swivel wheels or casters 16 rest on respective ones of the turntables 22. The path of the righthand and lefthand wheels are indicated by the lines 46,47, respectively. In FIG. 2, the lefthand swivel wheel 16 is partially shown in phantom as it is just engaging its respective turntable 22.

In this loaded position, a generally vertical swivel axis of each swivel wheel 16 is indicated at 51 in FIG. 3. The inclination of the turntable surfaces 23, using the influence of gravity, biases the swivel wheels 16 laterally outwardly. The swivel wheels 16 carried by the "free-turning" turntables 22 assume positions indicated by phantom lines in FIG. 3, as the cart 10 is parked in the fully loaded position. The turntables 22 turn in directions indicated by the arrows 52,53. This initial swivel action results from the natural tendency of the cart 10 and the swivel wheels 16 to seek a lower potential energy state by descending along the respective planes of the turntable surfaces 23. When the transfer device 13 operates to unload the cart, the swivel wheels 16 resume their outward swiveling movement until they completely reverse from their original orientation. This swiveling movement of each wheel 16 is ensured by the torque on it developed by reaction force on the turntable surface 23, which is eccentric to its swivel axis 51 once the wheel is initially slightly turned, as earlier described, during the loading movement. Since the swivel wheels 16 are caused to turn outwardly by the turntables 22 for their reversal, interference between the wheels and the transfer device 13 is avoided. This feature is particularly important where the track width of a cart 10 is relatively narrow and the swivel wheels would not have enough clearance with the transfer device 13 to swing inwardly for their reversal.

Figure 4:
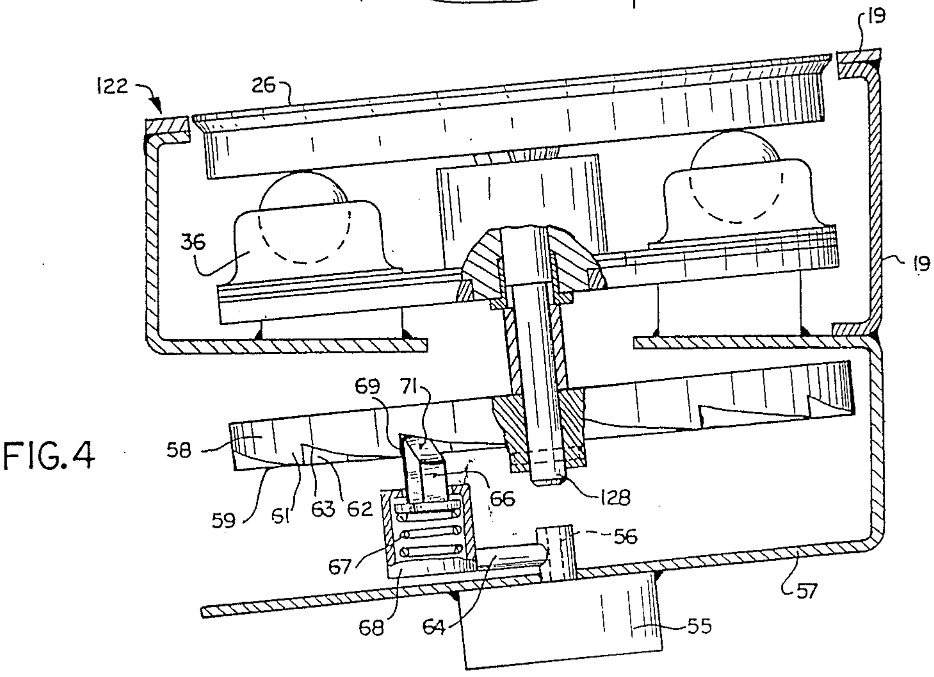
FIG. 4 is a fragmentary, cross-sectional view of a power-operated wheel reversing apparatus in accordance with a second embodiment of the invention.

Referring now to FIG. 4, there is shown a second embodiment of the invention, parts illustrated in FIG. 4 which are the same as those of FIG. 2 are given identical numeral designations and analogous parts are given the addition of 100 to the previously used numeral designation. In this embodiment, a turntable 122 includes a power actuator 55 in the form of a rotary solenoid. The solenoid 55 is of generally conventional construction and is electrically operated. The solenoid 55 has an output shaft 56 arranged in coaxial relation with a turntable axle 128 and is fixed to a mounting bracket 57 secured to the platform framework 19. Interposed between the solenoid 55 and turntable plates 26, 27 is a circular ratchet plate 58 keyed to the lower end of the turntable axle 128. A lower face 59 of the ratchet plate 58 has a series of ratchet teeth 61 angularly spaced evenly about the axis of the axle or spindle 128. Each of the teeth 61 has a face 62 lying in a plane parallel to the axis and an inclined face 63 in a plane skewed with respect to the axle axis. A drive arm 64 is clamped on the solenoid shaft 56. At an outer end of this drive arm 64 is a driving pin element 66 which is adapted to engage the axially aligned face 62 of an adjacent ratchet tooth.

The drive element or pin 66 is resiliently biased upwardly to the illustrated position by a spring 67 carried in a retainer 68 fixed to the arm 64. Opposite a driving face 69 of the pin 66, the pin has a sloped or cam face 71. Preferably, the solenoid 55 has an angular stroke greater than the angular spacing between the ratchet teeth 61 to ensure that after each solenoid stroke the arm 64 returns a distance to positively engage a successive tooth. In the illustrated embodiment, for example, the ratchet teeth 61 are spaced on 40-degree centers, and the solenoid 55 operates through a stroke of 45 degrees. In this second embodiment, a rotary solenoid driven turntable 122 is provided on each side of the car 11.

In operation, when a cart 10 is loaded onto the platform 19 by the transfer device 13, a suitable limit switch, for example, sensing the presence of the front wheels 17 on the trip plates 45, initiates electrical energization of the rotary solenoids 55 at both sides of the platform 19. The drive pin face 69 engages the face 62 of the adjacent ratchet tooth 61 and positively turns the turntable 122 through an angle of at least 40 degrees. The cart swivel wheel 16 supported by the turn table surface 23 is caused to rotate outwardly about its swivel axis 51 to the position indicated in FIG. 3 at the phantom lines. When the solenoid 55 returns its stroke, the angle or inclined face 63 cams the pin 66 downwardly along the inclined tooth surface 63 to prevent reverse movement of the turntable 122. When the cart 10 is off-loaded by the transfer device 13, the swivel wheels 16 completely reverse their direction, as discussed above.

Figure 5:
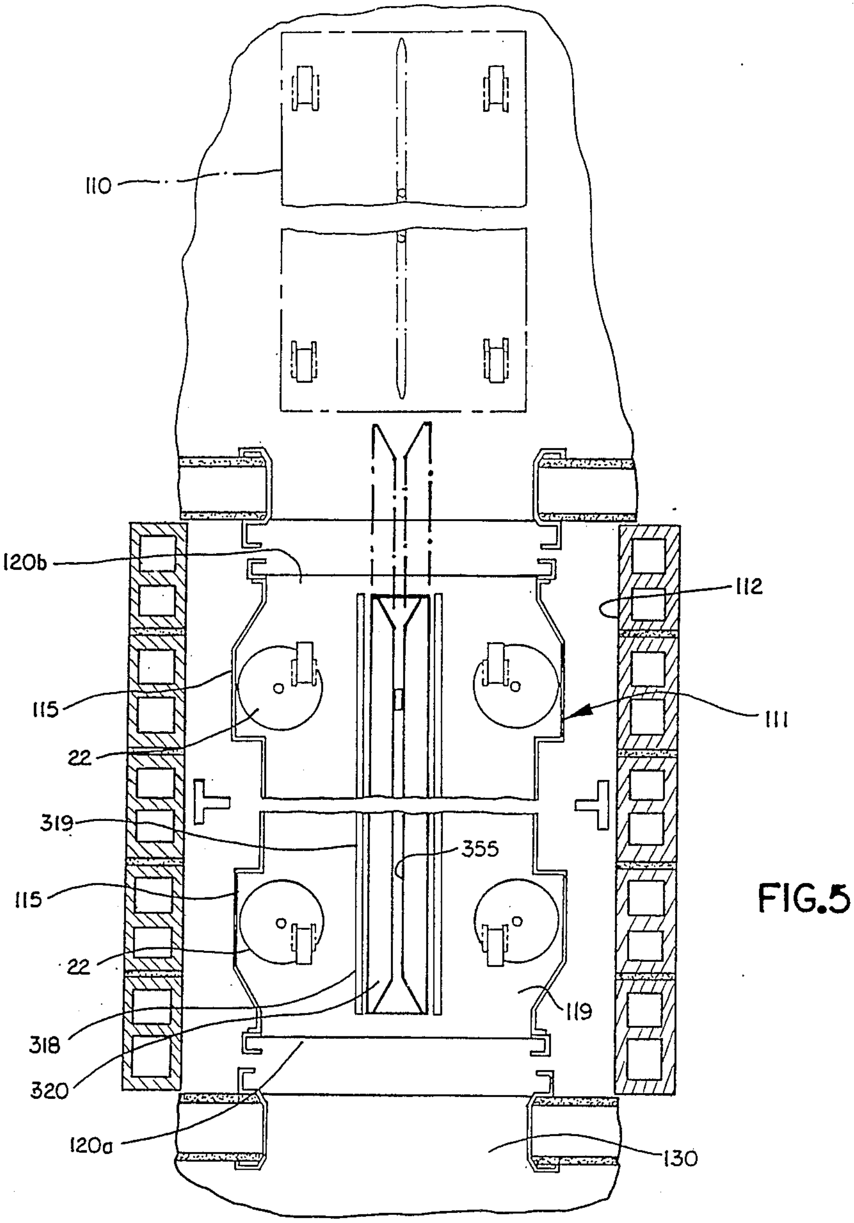
FIG. 5 is a somewhat schematic, fragmentary, plan view, similar to FIG. 3, illustrating a hoistway car platform arranged to receive or discharge a cart from either of its ends.

FIGS. 5 through 9 illustrate additional features of the invention. In FIG. 5, a hoistway car 111 includes a platform 119 and operates in a vertical shaft or hoistway 112 between vertically spaced landings or floors in a generally conventional manner. The illustrated platform 119 in plan view has the general configuration of a rectangle, with the addition of lateral projections 115 adjacent each of its corners. Wheel reversing apparatus, including a turntable 22, is provided in each of the pocket areas formed by the corner projections 115. The turntables 22 are identical to that illustrated in FIG. 2 or FIG. 4. As discussed below, the car 111 can receive or eject a cart 110 from either of its ends 120*a* and 120*b*. A transfer device 318 for automatically loading and unloading carts on the car 111 is installed on the platform 119. The transfer device 318 is substantially the same, with certain important exceptions set forth below, as that disclosed in U.S. Pat. No. 4,148,404, the disclosure of which is incorporated herein by reference. Parts of the transfer device 318, corresponding to those of the patent, are identified with reference numerals of a value 300 greater than those used in the patent. The transfer device 318 includes an elongated main carriage 320 which is mounted to telescope in horizontal translation in and partially out of a stationary main frame 319.

Movement of the carriage 320 in and out of the main frame 319 is at either end of the frame, depending on which end 120*a* or 120*b* of the platform 119 a cart 110 is being received or ejected. In FIG. 5, the carriage 320 is shown at an intermediate phantom position on an excursion from the car end 120*b* to pick up or to eject a cart 110 on a typical floor landing 130.

Figure 6:
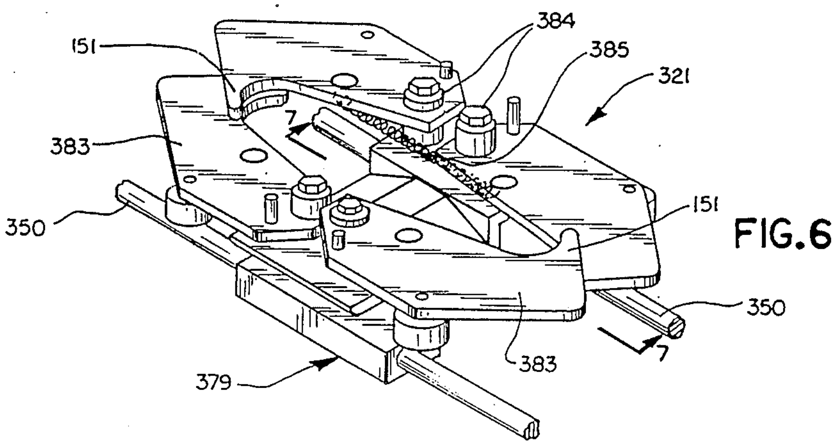
FIG. 6 is a perspective view of a coupler carriage of a transfer device on the car platform.

Within the carriage 320 is a coupler carriage 321, most clearly illustrated in FIG. 6. The coupler carriage 321 corresponds to that illustrated in the aforementioned patent No. 4,148,404. The coupler carriage 321 includes a housing 379 which rides on spaced, horizontal rails or guide bars 350 supported so that the carriage can move in a horizontal path parallel and just below a slot 355 of the carriage 320. The coupler assembly carriage 321 is moved longitudinally by cables 310*a,b* trained over pulleys or sheaves 390*a, b* (FIG. 7) fixed to its lower sides. On the upper face of the coupler assembly 321 are coupler arms or latches 383 pivotable about associated pivot pins 384 and biased to their closed position illustrated in FIG. 6 by associated tension springs 385.

Figure 7:
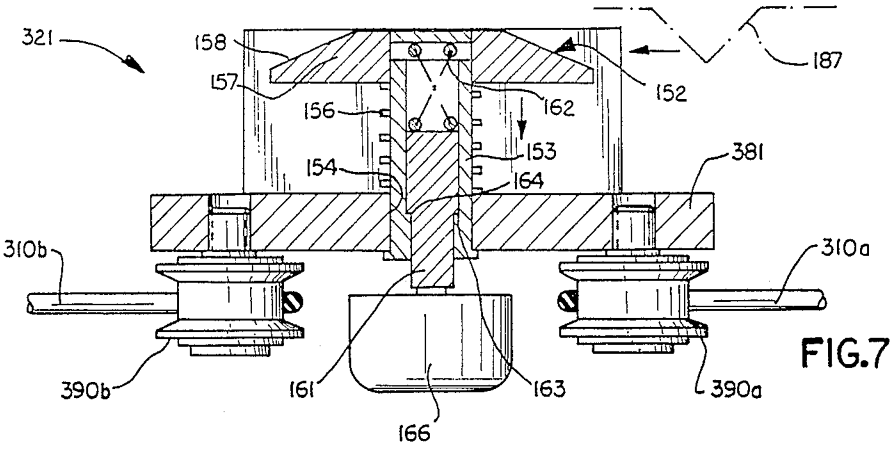
FIG. 7 is a sectional view of a portion of the coupler carriage taken along the line 7—7 indicated in FIG. 6.
Figure 8:
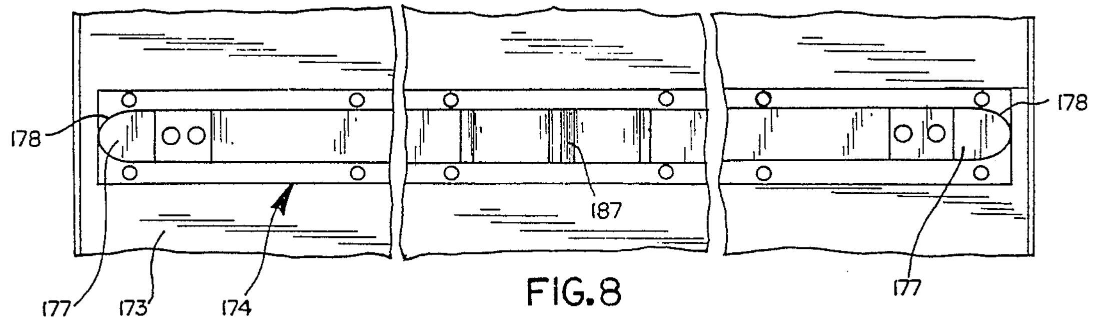
FIG. 8 is a fragmentary view of the underside of a modified cart incorporating a guide bar and coupling pin assembly.
Figure 9:
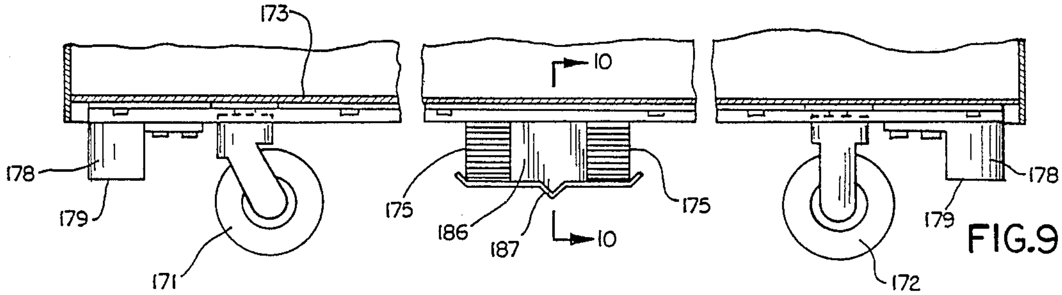
FIG. 9 is a fragmentary, side elevational view of the modified cart incorporating the guide bar and coupling pin assembly with a centrally disposed position indicating cam.
Figure 10:
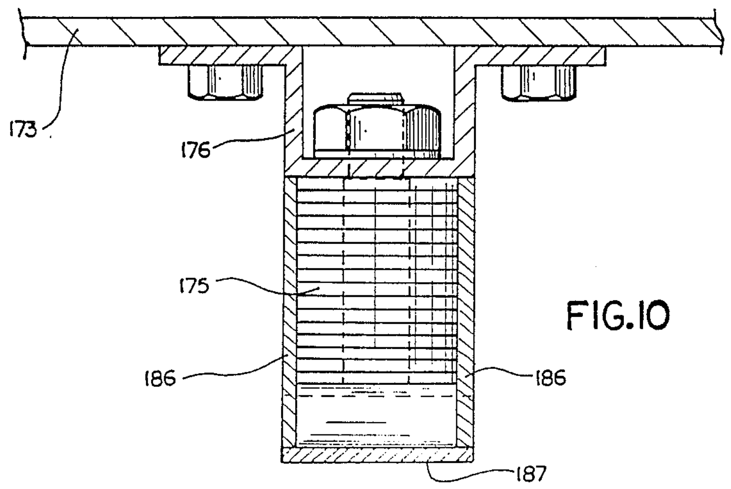
FIG. 10 is a sectional view of the guide bar and coupling pin assembly taken in the plane indicated by the line 10—10 in FIG. 9.

As shown most clearly in FIG. 7, the coupler assembly 321 includes cart sensing means in the form of a probe assembly 152. The probe assembly 152 includes a vertical, hollow pin 153 slidably disposed in a complementary hole 154 in a central block 381 of the coupler assembly housing 379. The pin 153 is resiliently biased upwardly by a coil spring 156 assembled around it and uncompressed between the upper surface of the block 381 and a cam block 157 fixed to an upper end of the pin 153. The cam block 157 includes inclined cam surfaces 158 each extending from the pin 153 in opposite directions parallel to the line of movement of the coupler assembly 321 with decreasing elevation. Telescoped in the pin 153 is a second or inner pin 161 biased downwardly by a spring 162. A shoulder 163 on the pin 161 abuts a radial surface 164 in the hollow pin 153 to limit its downward movement relative to the hollow pin. A lower end of the pin 161 projects out of the hollow pin 153 and has an indicator vane 166 suitably fixed thereto. The cam block 157 is under and vertically aligned with the slot 355 of the carrige 320.

For illustrative purposes, the cart 110 is in the form of a simple boxlike container, but can have other conventional forms, such as a stack of vertically spaced shelves. The cart 110 is supported on a set of four wheels, a pair 171 of which at one end can be castered for steering purposes, while the other pair 172 is fixed. In the illustrated case, the lengthwise direction of the cart 110 is taken as its principal direction of travel, as determined by the rolling direction of the fixed wheels 172. On a lower side of a bottom wall or pan 173 of the cart 110 is means for coupling the cart with the transfer device 318 in the form of a guide bar assembly 174 and coupling pins 175. The guide bar assembly 174 includes a flanged U shaped channel 176 suitably bolted or otherwise fixed to the center of the lower side of the bottom pan 173, with its longitudinal axis aligned with the lengthwise direction of the cart 110. Bolted to each end of the guide bar channel 176 are guide pins 177. Endwise faces 178 of the guide pins 177 are rounded and tapered to facilitate their entry and passage through the slot 355 of the carriage 320. The guide pins 177 are set on the guide bar channel 176 so that they positively pass into the slot 355 while their lower ends, designated 179, are high enough to horizontally pass over the coupler latch arms 383. As shown, the guide pins are spaced longitudinally apart a substantial distance preferably at least equal to half the length of the cart 110. Additionally, the guide pins 177 are equally spaced from respective adjacent ones oF the coupler pins 175. Ideally, the coupler pins 175 and guide pins 177 are symmetrically disposed about a vertical central plane generally midway between the pairs of wheels 171, 172.

The coupling pins 175 each comprise a plurality of washers assembled on a shoulder bolt fastened to the lower web of the guide bar channel 176. Parallel, vertical plates 186 box the space between the coupler pins 175 and have their outer surfaces in vertical planes generally tangent to the cylindrical surfaces of the pins. A lug or cam 187, with a V-shape in a longitudinal plane of the cart, is disposed at the longitudinal center of the cart midway between the coupling pins 175 and depends below the lower extremity of these pins. The lug or cam 187 is sufficiently narrow in a transverse direction to readily pass through the slot 355.

The transfer device 318 operates essentially in the same manner as that set forth in referenced patent No. 4,148,404 to automatically load or eject a cart 110 on and off the car 111.

The system of the invention disclosed herein provides additional features to those afforded by the system shown in the referenced patent No. 4,148,404. The turntables 22 at opposite ends of the car 111 allow a cart 110 to be loaded from either end of the car and, similarly, unloaded from either end. When the cart 110 is unloaded from the end at which it was loaded, operation of the turntables 22 is as described above in connection with the embodiment of FIGS. 1–3. Where the cart 110 is unloaded from a car end opposite that at which it was loaded, the cart wheels do not completely reverse when passing over respective turntables 22 and immediately correct any skew upon leaving such turntables. The turntables can be power-operated, as in the embodiment of FIG. 4.

The probe assembly 152 is effective to indicate the arrival of a cart 110 into the center of the car platform 119. As suggested in FIG. 7, the lug 187, indicated in phantom in this figure, carried on the center of the bottom oF the cart 110 is arranged to engage an inclined surface 158 of the cam block 157. When the cart 110 is centered over the coupler assembly 321, the lug 187 is over the cam block 157 and depresses it against the spring 156 to indicate its centered position. A suitable proximity switch (not shown) centered at a stationary point within the transfer device 318 detects this displacement of the vane 166 downward from the position illustrated in FIG. 7 as an indication that a cart 110 is fully centered on the platform 119, so that associated electrical control circuitry can be appropriately signaled. The second spring 162 allows the vane 166 to retract relative to the hollow pin 153 in case it hits an obstruction. It will be understood from the explanation of referenced patent No. 4,148,404 that the coupler assembly 321 moves within the carriage 320 at a rate relative to the platform 119 twice that of the carriage; when the carriage moves from a central rest position on the platform to an extended position over a landing, the coupler assembly moves from a center position to the distal end of the carriage 320.

The guide bar assembly 174 stabilizes the cart 110 against sidewise or yaw movement which might otherwise occur because of the tendency of the wheels 171 to caster. A guide pin 177, closest to the car platform 119, is engaged with the longitudinal edges of the slot 355, while the coupler pins 175 are captured by the latch arms 383 until the cart is substantially completely on or off the platform. The relatively large spacing between the coupler pins 175 and guide pins 177 prevents any signficant yaw of the cart during loading or unloading action despite practical clearances between these elements and the transfer device 318.

Provision of the guide bar assembly 174 on a cart 110 can alleviate the need for drawbridges on the car platform, such as those provided on the car of FIGS. 1 and 3. The plates 186 boxing the space between the coupling pins 175 prevent the fingers 151 of the coupler arms 383 from closing on only one pin 175, since these fingers cannot enter the space between the pins. This feature avoids jamming or partial loading of the cart on the platform if the cart is improperly positioned on the landing and the transfer device 318 cannot extend far enough to allow the outward fingers 151 to pass beyond the distal coupling pin.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. An automatic cart lift system for moving wheeled carts between levels, comprising a car vertically movable in a hoistway, the car having a platform indexable with the levels, an automatic transfer device on the platform, said transfer device having a horizontal slot adjacent the plane of the platform, a wheeled cart supported by a multiplicity of wheels including a swiveled set adjacent one end and movable on and off the platform, said cart having a bottom wall and guide means depending below the bottom wall, said guide means being arranged to pass horizontally into the slot of the transfer device, the guide means with reference to the direction of cart travel on and off the platform having a first portion adjacent the center of the cart and a second portion adjacent an end of the cart such that said first and second portions are spaced from each other a distance in the order of one-half the length of the cart whereby the cart is laterally guided on and off the platform by interengagement between the guide means and the slot at points spaced a relatively large distance in the direction of travel so that a tendency of the cart to yaw on said swivel wheels is resisted.

2. A system as set forth in claim 1, wherein said platform includes swivel wheel reversing means adjacent at least one end of the platform.

3. A system as set forth in claim 2, wherein said transfer device includes a carriage movable from a position fully received by the platform to an extended position over a landing of a level, said carriage being arranged in its extended position to provide said slot in a zone overlying said landing.

4. A system as set forth in claim 3, wherein said transfer device is arranged to load and unload a cart from either of a pair of opposite ends of the platform.

5. A system as set forth in claim 4, wherein said platform includes swivel wheel reversing means at opposite ends.

6. A system as set forth in claim 5, wherein said cart and transfer device include interacting means operable at the center of the cart and platform to indicate the presence of the cart at a central location on the platform.

* * * * *